United States Patent [19]

Kageyama

[11] Patent Number: 4,584,160

[45] Date of Patent: Apr. 22, 1986

[54] PLASMA DEVICES

[75] Inventor: Katsuhiro Kageyama, Yokosuka, Japan

[73] Assignee: Tokyo Shibaura Denki Kabushiki Kaisha, Kanagawa, Japan

[21] Appl. No.: 423,293

[22] Filed: Sep. 24, 1982

[30] Foreign Application Priority Data

| Sep. 30, 1981 | [JP] | Japan | 56-153763 |
| Dec. 10, 1981 | [JP] | Japan | 56-197732 |
| Dec. 10, 1981 | [JP] | Japan | 56-197733 |
| Mar. 12, 1982 | [JP] | Japan | 57-38153 |
| Mar. 12, 1982 | [JP] | Japan | 57-38157 |
| Mar. 12, 1982 | [JP] | Japan | 57-38159 |

[51] Int. Cl.$^4$ ............................................. G21B 1/00
[52] U.S. Cl. .................................... 376/141; 376/136
[58] Field of Search ................ 376/136, 139, 140, 141

[56] References Cited

U.S. PATENT DOCUMENTS

| 3,024,182 | 3/1962 | Furth et al. | 376/141 |
| 3,032,490 | 5/1962 | Simon | 376/141 |
| 3,104,345 | 9/1963 | Wilcox et al. | 376/141 |
| 3,326,769 | 6/1967 | Neidigh et al. | 376/140 |
| 3,467,885 | 9/1969 | Cann | 376/141 |
| 3,655,508 | 4/1972 | Hirsch | 376/140 |

OTHER PUBLICATIONS

Nuclear Fusion, vol. 19, No. 8, Aug. 1979, pp. 1085–1137, Vienna (AT).

*Primary Examiner*—Harvey E. Behrend
*Attorney, Agent, or Firm*—Stevens, Davis, Miller & Mosher

[57] ABSTRACT

Plasma apparatus comprises a vacuum vessel, a device for creating an open-ended magnetic field containing a plasma, a plurality of electrostatic plugs disposed at the open-ended portions of the magnetic field. At least one of the electrostatic plugs comprises a limiter attached to the vacuum vessel, provided with an inner hollow portion and arranged so as to confine the plasma, an anode electrode disposed at the open-ended portion and provided with an inner hollow portion extending along a direction of the open-ended magnetic field, a cathode electrode disposed with space from the anode electrode on the side opposite to the limiter and coaxially with the anode electrode and the limiter, a control electrode passing through a through hole provided for the cathode electrode and extending into the hollow portion of the anode electrode so as to operate to control electrode density thereby to determine the space potential distribution, and electric power applying means so that potentials are applied to the anode electrode, the control electrode, the limiter, and the cathode electrode so as to be higher in the stated order.

9 Claims, 23 Drawing Figures

FIG. IA
PRIOR ART
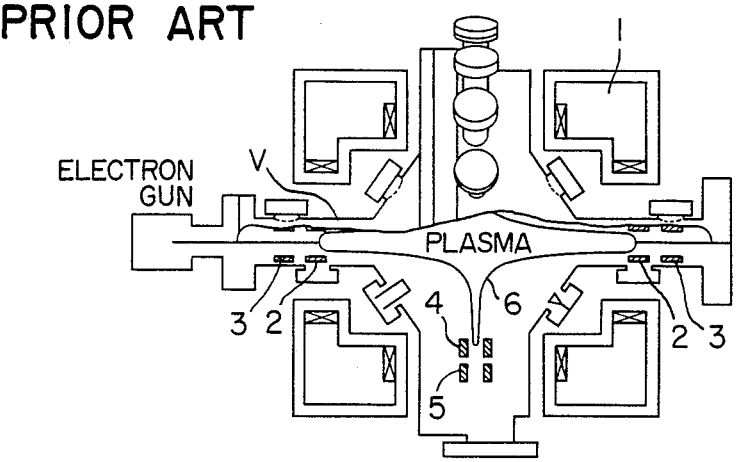
FIG. IB
PRIOR ART
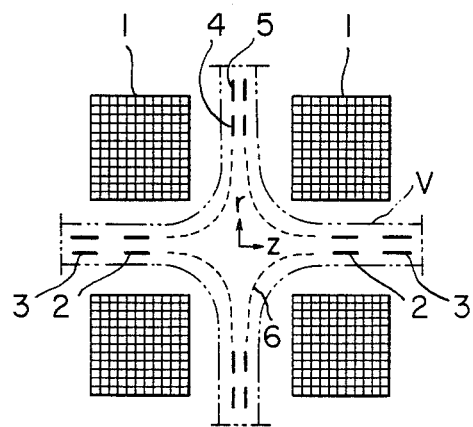
FIG. 2
PRIOR ART
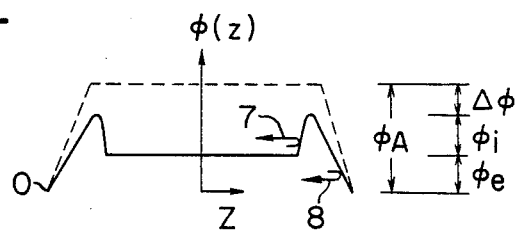

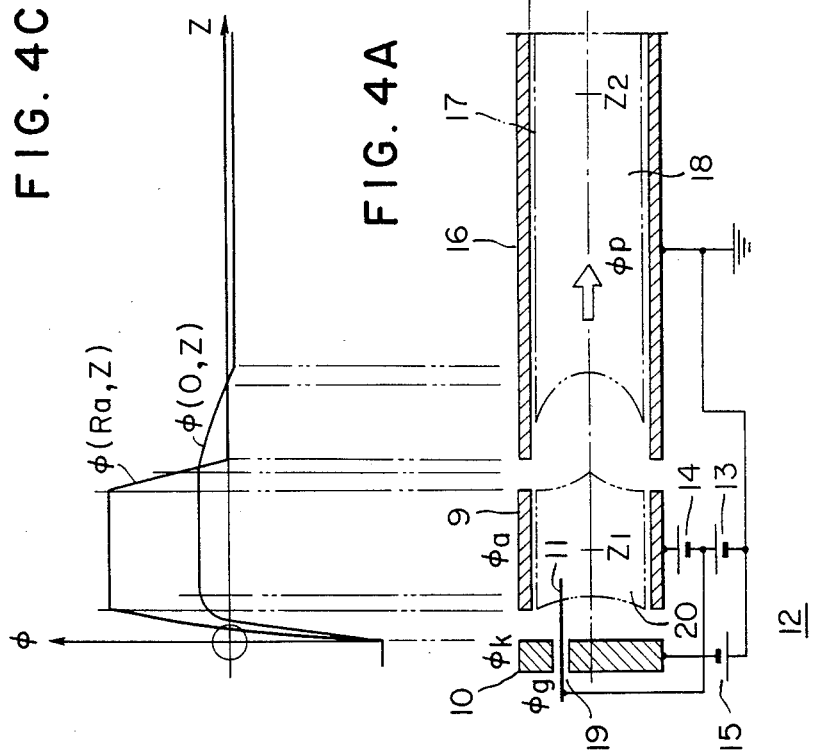
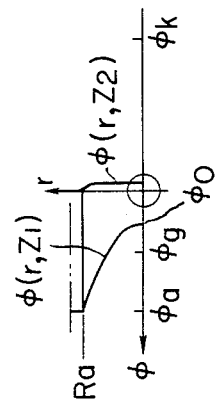
FIG. 4A  FIG. 4B  FIG. 4C

PLASMA DEVICES

BACKGROUND OF THE INVENTION

This invention relates to plasma devices capable of confining a plasma, especially at a high temperature and a high density, in an open-ended magnetic field for a long time period.

DESCRIPTION OF THE PRIOR ART

It is well known for an ideal nuclear fusion reactor that it is necessary to confine plasma in a magnetic field for a long period. Moreover, in plasma devices used for the nuclear fusion, confinement of the plasma for a long term secures and obtains such significant effects as low consumption of electric power for generating the plasma, increasing of plasma density, and reduction of heattransfer to a wall enclosing the plasma. In order to increase the plasma confinement time in the open-ended magnetic field, it is necessary to provide plugging means at the open ends of the magnetic field, which is described, for example, in a publication "Gormezano: Reduction of Losses in Open-Ended Magnetic Traps: Nuclear Fusion, 19 (1979), 8, 1085".

The plugging is usually carried out by a high frequency method or a method utilizing an electrostatic field such as a method utilizing electrodes and an ambipolar potential containment method due to a tandem mirror type magnetic field. These methods have been studied and developed, and the electrostatic method utilizing electrodes is carried out by, for example, an electromagnetic trap which utilizes electrostatic plugs each comprising an anode and a cathode at point cusps and a line cusp of a magnetic field.

FIGS. 1a and 1b are schematic diagrams showing the principle of an electromagnetic trap, which is disclosed in a publication of "T. J. Dolan, B. L. Stansfield and J. M. Larsen: Plasma Potential in Electrostatically Plugged Cusps and Mirrors". The Physics of Fluids, 18 (1975), 10, 1383.

In each of FIGS. 1a and 1b, a pair of coils 1 are wound about a Z-axis to form a cusp magnetic field. Hollow cylindrical anode and cathode electrodes 2 and 3 are located at each of the point cusps and a pair of annular anode electrodes 4 and a pair of annular cathode electrodes 5 are disposed in a line cusp. One vacuum vessel V is located between a space defined by the paired coils 1 and an inner space of the coils and a gas to be converted into plasma is filled in the vacuum vessel. An electron gun EG is located at the outside of at least one cathode electrode 3 and electrons ejected from the electron gun pass through the cathode and anode electrodes 3 and 2 and move inside the vacuum vessel so as to ionize the gas filled therein and create plasma. Dotted lines 6 (see FIG. 1b) show the boundary of a space within which the plasma is created. Assuming that a potential of the cathode electrodes 3 and 5 is zero and that a potential of the anode electrodes 2 and 4 is $\phi_A$, space potential $\phi$ near the Z-axis is distributed as shown in FIG. 2 and a potential $\phi_e$ in the space within which the plasma is created (plasma space) has a relationship of $0 < \phi_e < \phi_A$. On both sides of the plasma space, peaks of potential are formed inside the hollow anode electrode 2 and the potential of the highest peak value is designated by $\phi_e + \phi_i$. Ions each having a kinetic energy lower than that $Ze\phi_i$ and electrons each having a kinetic energy lower than that $e\phi_e$ (where Ze designates electric charge of an ion and electric charge of an electron is designated by $-e$) cannot escape from the plasma space along a direction of the magnetic field and the ions and electrons are reflected and returned towards the plasma as shown by arrows 7 and 8, respectively. In other words, by determining potentials $\phi_i$ and $\phi_e$ for a plasma with an electron temperature $T_e$ and an ion temperature $T_i$ so as to satisfy the relationship such as $$\phi_i >> kT_i/Ze;\ \phi_e >> kT_e/e \quad (1)$$

(where k represents Boltzmann's constant) a plugging effect is exerted at the open ends of the plasma and the plasma confinement time is significantly improved, which was the electromagnetic trapping effect in the prior art. However, this electromagnetic trapping effect includes problems as described hereunder. Although the maximum space potential in the anode electrode 2 is shown as $\phi_i + \phi_e$ in FIG. 2, a potential difference $\Delta\phi(\Delta\phi = \phi_A - (\phi_i + \phi_e))$ between the potential of the anode electrode 2 and the space potential does not become zero and the reason why $\Delta\phi$ is not extinguished results from the fact that a group of electrons, referred to as an electron swarm hereafter is formed by the capture of electrons in the hollow anode electrode and an electric field is created by space charge due to the electron groups.

$\Delta\phi$ is shown by $\Delta\phi = \Delta\phi(r)$ as a function of r which represents the distance from the Z-axis. In consideration of the direction of the electric field, the relationship $$\partial(\Delta\phi)/\partial r < 0 \text{ for } r > 0 \quad (2)$$

is obtained. Since the r component of the electron field on the Z-axis is considered to be zero, $\Delta\phi$ takes its maximum value $\Delta\phi_{max}$ when r equals zero ($\Delta\phi_{max} = \Delta\phi(0)$). Accordingly, the potential on the Z-axis in the anode electrode is represented from the relationship (2) as $\phi_i + \phi_e = \phi_A - \Delta\phi_{max}$. Although $\phi_i$ and $\phi_e$ are determined by a particle equilibrium for the plasma $\phi_i$ and $\phi_e$ are approximately of the same magnitude, that is $\phi_i \sim \phi_e$, and hence $\phi_i \sim \phi_e \frac{1}{2}(\phi_A - \Delta\phi_{max})$ on the Z-axis. For an electromagnetic trap, $\Delta\phi_{max}$ becomes considerably large and approximately equals to $\phi_A$ and as the result, $$\phi_i \sim \phi_e \sim 0, \text{ for } r = 0 \quad (3)$$

is established on the Z-axis and the relationship (1) is not established. However, the relationship (1) is established at the most portions in the anode electrode 2 and the relationship (3) is established at only a portion in which r is very small, so that with the electromagnetic trap, the time interval for plasma confinement by means of the electrostatic plugs is increased, but a loss-aperture is formed on the plugs as a result of the establishment of the equation (3) and the plasma leaks through the aperture which adversely affects the advantageous effect due to the increase of the plasma trapping interval.

SUMMARY OF THE INVENTION

An object of this invention is to provide a plasma device provided with an improved electrostatic plug having no loss aperture to thereby increase the plasma trapping interval.

Another object of this invention is to provide a plasma device capable of confining a plasma with high temperature and density for a long time period.

According to this invention, there is provided a plasma device of the type comprising a vacuum vessel, a device for generating an open-ended magnetic field containing a plasma, at least one limiter provided with an inner hollow portion and contacting with the plasma for controlling a potential of the space in which the plasma is confined, a plurality of electrostatic plugs disposed at open-ended portions of the magnetic field and establishing an electric field having a non-zero component parallel with a direction of the magnetic field, and characterized in that at least one of the electrostatic plugs comprises the aforementioned limiter an anode electrode disposed at the open-ended portion and spaced therefrom and provided with an inner hollow portion extending along a direction of the open-ended magnetic field so as to pass therethrough all magnetic lines passing through the inner hollow portion of the limiter, a cathode electrode spaced from the anode electrode on the side opposite to the limiter, the cathode electrode being provided with a through hole, a control electrode disposed so as to pass through the through hole of the cathode electrode and extending into the hollow portion of the anode electrode without contacting with the cathode electrode, and potential applying means for applying potentials to the anode electrode, the control electrode, the limiter, and the cathode electrode the potentials thereof being higher in the stated order.

BRIEF DESCRIPTION OF THE DRAWINGS

In the accompanying drawings:

FIGS. 1a and 1b are schematic diagram of a plasma device of a prior art showing principle of an electromagnetic trap;

FIG. 2 is a diagram representing the potential distribution near the axis of the electromagnetic trap according to the plasma device shown in FIGS. 1a and 1b;

FIG. 4a is a schematic sectional view showing an electrostatic plug of the plasma device shown in FIG. 3;

FIGS. 4b and 4c are diagrams representing potential distributions in the plasma device shown in FIG. 3;

DESCRIPTION OF PREFERRED EMBODIMENTS

Figure 3:
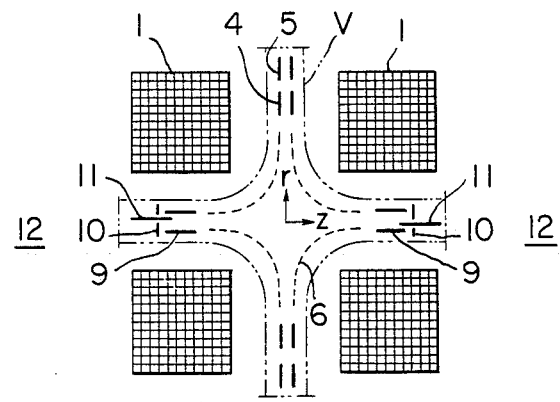
FIG. 3 is a schematic diagram of a plasma device according to this invention.

FIG. 3 shows a schematic view of a plasma device representing one embodiment of the present invention, in which a pair of coils 1 is wound axially symmetrically about the Z-axis so as to creat a cusp magnetic field which is one type of open-ended plasma trapping magnetic field and to confine the plasma therein in combination with an excitation power source, not shown. A pair of annular anode electrodes 4 are disposed at portions of a line cusp which is one of the open ends of the cusp magnetic field and a pair of annular cathode electrodes 5 are also disposed at the line cusp. These anode and cathode electrodes 4 and 5 constitute an electrostatic plug means creating an electric field having a non-zero component in a direction parallel with the magnetic field in the line cusp. A vacuum vessel V is disposed between a space defined by the paired coils 1, and the vacuum vessel is provided with a limiter to be described later defining the boundary of the confined plasma. An electric potential $\phi_p$ in the space in which the plasma is created (plasma space) is controlled by the electric potential $\phi_l$ of the limiter in this embodiment. Namely, a potential difference, sheath potential $\phi_s$, between the plasma and the limiter is determined by the transmission of the ions and electrons, thus determining the potential $\phi_p$ as follows.

$$\phi_p = \phi_l + \phi_s \quad (4)$$

An electrostatic plug 12 is constituted by an anode electrode 9 provided with an inner hollow portion axially extending in parallel with the magnetic field, a plate cathode electrode 10, a fine control electrode 11 and the limiter 16 (see FIG. 4a) attached to the vacuum vessel. According to this embodiment, such electrostatic plugs 12 are located at point cusps at the open ends of the cusp magnetic field, respectively, the electrostatic plugs 12 forming an electric field having a component (not zero) parallel to the direction of the magnetic field, which is described in detail hereinafter.

FIGS. 4a, 4b and 4c show a main portion of the plasma device, i.e. electrostatic plug 12 and functions thereof, in which FIG. 4a designates the electrostatic plug portion, FIG. 4b is a function diagram showing the r-dependence of the space potential $\phi(r,Z)$, and FIG. 4c is a function diagram showing Z-dependence of the spaced potential $\phi(r,Z)$. An electric potential $\phi_a$ is applied to the anode electrode 9 by power sources 13 and 14, an electric potential $\phi_g$ is applied to the control electrode 11 by the source 13, and an electric potential $\phi_k$ is applied to the cathode electrode 10 by a power source 15, and a relationship $$\phi_k < 0 < \phi_g < \phi_a \quad (5)$$

is established between these potentials. Reference numeral 16 designates a hollow cylindrical limiter attached to the vacuum vessel and grounded and the plasma contacts to the inner surface of the limiter through a sheath 17. The inner diameter of the limiter 16 is equal to that of the anode electrode. From the formula (4) the space potential $\phi_p$ is considered to be $\phi_s$, and relationships $$|\phi_p| << |\phi_k|, \phi_g, \phi_a$$

and $$\phi_k < \phi_p < \phi_g < \phi_a \qquad (6)$$

in view of the formula (5) are established because the absolute values of the respective potentials $\phi_k$, $\phi_g$, and $\phi_a$ are predetermined to be considerably large for effectively operating the electrostatic plug 12.

As shown in FIG. 4, the cathode electrode 10 is axially spaced from the anode electrode 9 on the side opposite to the plasma space and the cathode electrode 10 is provided with a through hole 19 through which the control electrode 11 penetrates so as not to contact with the anode electrode 11 and extends into the inner hollow portion 20 of the anode electrode 9.

Within the hollow portion 20 of the anode electrode 9 is formed an electron swarm by electron capture which has been described hereinbefore with respect to the electron capture inside the anode electrode of the electrostatic plug 12 at the point cusp of the electromagnetic trap and an electric field is created by space charges caused by the electron group. Differences between the electrostatic plug of the plasma device according to this invention and the electrostatic plug located at the point cusp of the electromagnetic trap of the prior art reside in that according to this invention, the density of the electron groups are controlled by the control electrode whose potential is $\phi_g$ and by the anode electrode 9 whose potential is $\phi_a$, whereby the space potential within the hollow portion 20 of the anode electrode, $\phi(r,Z) = \phi(r,Z_1)$, is controlled and the formation of a loss-aperture due to the lowering of the potential barrier at the range of $r \sim 0$ as shown by the formula (3) can be avoided. The space potential $\phi(r,Z_1)$ in the follow portion 20 of the anode electrode 9 is represented as $$\phi(r,Z_1) = \frac{\phi_a - \phi_g}{1 - R_g^2/R_a^2} \cdot \left(\frac{r}{R_a}\right)^2 + \phi_0;$$

$$\phi_0 = \frac{\phi_g - (R_g^2/R_a^2) \cdot \phi_a}{1 - R_g^2/R_a^2}, \phi_0 > \phi_p, \qquad (7)$$

where $R_a$ is the radius of the hollow portion 20 of the anode electrode and the distance between the control electrode and the Z-axis is equal to $R_g$ and $\phi_0$ is the minimum value of $\phi(r,Z_1)$ which is taken at $r=0$, whereby the condition of $\phi_0 > \phi_p$ is the condition necessary for controlling the space potential by the control electrode 11. The space potential distribution $(r, Z_1)$ is represented by FIG. 4b and since the electric field is directed towards the r-direction, the electron groups drift about the Z-axis. It is observed that the potential distribution returns to the stable condition as represented by the equation (7) by the operation of the control electrode 11 even if the potential distribution were changed. When the condition of the equation (7) is satisfied, the equation $$\phi(R_g, Z_1) = \phi_g \qquad (8)$$

is also established and as the electron density increases, the equation (8) changes as $\phi(R_g,Z_1) < \phi_g$. At this potential, the electrons rapidly collide with the control electrode 11 and are absorbed thereby, so that the electron density succeedingly decreases up to the time when the formula (8) will be established. If the electron density decreases less than that of the condition represented by the formula 7 or 8, the potential takes a condition of $\phi(R_g,Z_1) > \phi_g$ and the electrons do not collide with the control electrode 11. However, since the electron density is caused to increase by the electrons from the plasma, the potential will finally return to the condition represented by the formula (8). Thus, the space potential is maintained stably to have the distribution shown by the formula (7) by the operation of the control electrode 11.

Now considering a case where the potential $\phi(r,Z) = \phi(r,Z_2)$ of the space in which the plasma 18 is generated, the electric field of the plasma space is very weak, so that the potential $\phi(r,Z_2)$ is considered to be constant, i.e., $\phi(r,Z_2) = \phi_p$. Thus, the sheath potential $\phi_s$ equals to the space potential $\phi_p$. The sheath potential $\phi_s$ takes a negative value in accordance with the difference of the Larmor radii of the ions and electrons constituting the plasma and the value $|\phi_p|$ is very small in comparison with the magnitudes of the potentials $|\phi_k|$, $\phi_g$, and $\phi_a$ applied to the respective electrodes of the electrostatic plug, i.e., $$|\phi_p| << |\phi_k|, \phi_g, \text{ and } \phi_a \qquad (9)$$

The potential distribution $\phi(r,Z_2)$ is also shown in FIG. 4 (b) and in FIG. 4 (c), a potential $\phi(0,Z)$ on the Z-axis and a potential $\phi(R_a,Z)$ on a line parallel to the Z-axis are shown.

Since the potential $\phi_0 = \phi(0,Z_1)$ is the minimum value of the potential $\phi(r,Z_1)$, the potential barrier is formed with respect to the ions and electrons regardless of the value of the distance r as shown in FIG. 2, and the loss-aperture does not exist. The plasma 18 exists within the limiter 16 of the vacuum vessel and is isolated from the electron group formed in the hollow portion 20 of the anode electrode 9. The ions are reflected by the potential barrier $\{\phi(r,Z_1) - \phi_p\}Z$ and the electrons are reflected by the potential barrier $\phi_p - \phi_k$. The relationship $$\phi_0 - \phi_p >> kT_i/Ze; \phi_p - \phi_k >> kT_e/e \qquad (10)$$

(where k represents Boltzmann's constant) corresponding to the relationship (1) is easily realized by the establishment of the relationship (9), whereby the plasma confinement time can be considerably increased according to the plasma device of this invention.

In another aspect of this invention, between the limiter 16 and the anode electrode 9 there is arranged an intermediate cylindrical electrode which is provided with an inner hollow portion as will be described hereinbelow.

Figure 5:
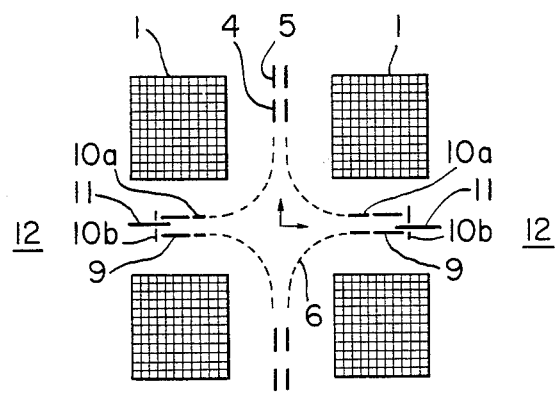
FIG. 5 is a schematic diagram of another embodiment of the plasma device according to this invention.

FIG. 5 is a schematic diagram showing one modification of this invention, in which like reference numerals are added to the elements corresponding to those shown in FIG. 3 or FIG. 4. In FIG. 5, reference numeral 10a designates an intermediate electrode having a negative potential with respect to the limiter, hereinafter called a first cathode electrode, having an inner hollow portion extending along an arrowed direction (FIG. 6) of the magnetic field and reference numeral 10b is a second cathode electrode corresponding to the cathode electrode 10 in FIG. 3 and between these first and second cathode electrodes 10a and 10b is disposed an anode electrode 9 spaced therefrom. In this embodiment, an electrostatic plug 12 is constituted by the first and second cathode electrodes 10a and 10b, the anode electrode 9, and a control electrode 11 and forms an electric field having a component (not zero) parallel to the direction of the magnetic field.

Figure 6A:
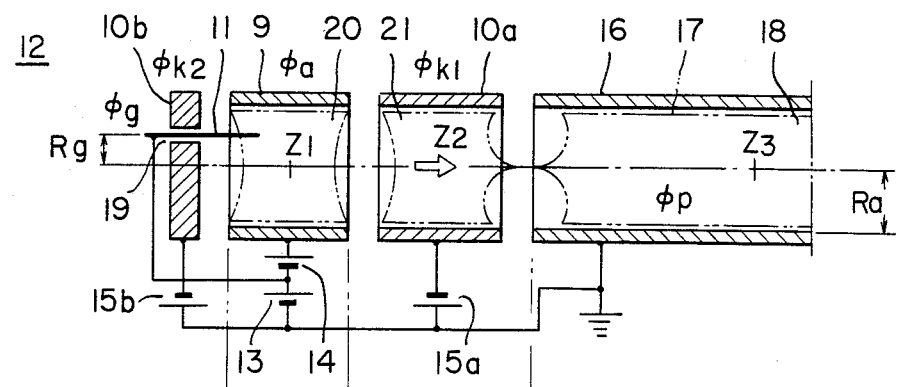
FIG. 6a is a schematic sectional view showing an electrostatic plug of the plasma device shown in FIG. 5.

With reference to FIG. 6a, a potential $\phi_a$ is applied to the anode electrode 9 from power sources 13 and 14, and potentials $\phi_g$, $\phi_{k1}$ and $\phi_{k2}$ are applied to the control electrode 11, the first and second cathode electrodes 10a and 10b from power source 13, 15a and 15b, respectively. A relationship $$\phi_{k1}, \phi_{k2} < 0 < \phi_g < \phi_a \quad (11)$$

is established between these potentials. Plasma 18 contacts to the inside surface of the earthed limiter 16 attached to a vacuum vessel through an ion sheath 17. The plasma space potential $\phi_p$ becomes equal to $\phi_s(\phi_p = \phi_s)$ from the equation (4), and since the absolute values of the respective potentials $\phi_a$, $\phi_g$, $\phi_{k1}$, and $\phi_{k2}$ are predetermined to be considerably large, the following relationship is established in consideration of the relationship (11).

$$|\phi_p| << |\phi_{k1}|, |\phi_{k2}|, \phi_g, \phi_a, \phi_{k1},$$
$$\phi_{k2} < \phi_p < \phi_g < \phi_a \quad (12)$$

The second cathode electrode 10b is provided with a through hole 19 through which the control electrode 11 extends into the hollow portion of the anode electrode 9 without contacting to the electrode 10b.

The functions and effects of the plasma device shown in FIG. 5 and FIG. 6a will be described hereunder in conjuction with FIGS. 6b and 6c.

As described hereinbefore with reference to the embodiment shown in FIGS. 3 and 4 in consideration of the equations (7) and (8), the lowering of the potential barrier and the formation of the loss-aperture caused thereby can be avoided. Thus, the space potential within the hollow portion 20 of the anode electrode is stably maintained to have the potential distribution shown by the equation (7) owing to the space potential control effect of the control electrode 11.

Figure 6B:
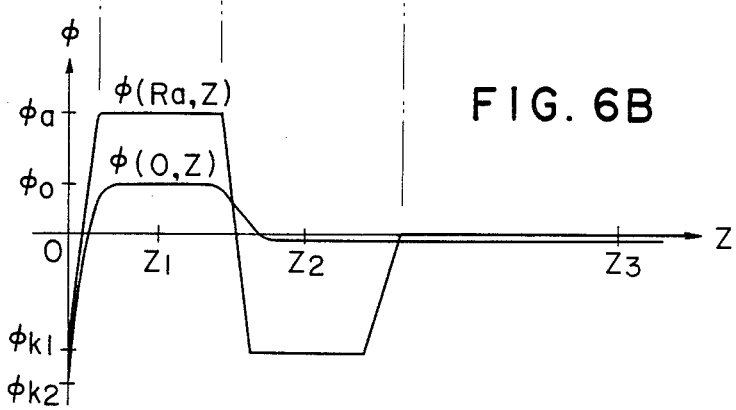
FIGS. 6b and 6c are diagrams representing potential distributions in the plasma device shown in FIG. 5.

The above-mentioned potential distribution in the space in which the plasma 18 is created is shown in FIG. 6b, where since the electric field is considerably weak in the plasma space, the space potential $\phi(r,Z) = \phi(r,Z_3)$ can be regarded to be constant, i.e. $\phi(r,Z_3) = \phi_p$. As described hereinbefore the sheath potential $\phi_s$ equals to $\phi_p$ ($\phi_s = \phi_p$), and the sheath potential $\phi_s$ takes a negative value because of the difference of the Larmor radii between the ion and the electron and the magnitude thereof is very small in comparison with the potentials $|\phi_{k1}|$, $|\phi_{k2}|$, $\phi_g$, $\phi_a$, namely a relationship $$|\phi_p| << |\phi_{k1}|, |\phi_{k2}|, \phi_g, \phi_a \quad (13)$$

is established.

In FIG. 6b, the potential $\phi_0(0,Z_1)$ on the Z-axis is the minimum value of $\phi(r,Z_1)$ and the potential $\phi_{k2}$ is smaller than $\phi_p$ ($\phi_{k2} < \phi_p$), so that the potential barrier is formed with respect to both the ions and electrons regardless of the value of the distance r, and the loss-aperture does not exist in the hollow portion 20 of the anode electrode 9. The plasma 18 exists within the limiter 16 and is isolated from the electron group formed in the hollow portion of the anode electrode 9. The ions and the electrons are reflected by the potential barriers $\{\phi(r,Z_1) - \phi_p\}Z$ and $(\phi_p - \phi_{k2})$, respectively. The relationship $$\phi_0 - \phi_p >> kT_i/Ze, \phi_p - \phi_{k2} >> kT_e/e \quad (14)$$

(where k represents Boltzmann's constant) corresponding to the relationship (1) can easily be realized in view of the relationship (13), whereby the plasma trapping time can significantly increase.

Regarding the first cathode electrode 10a, when space charge does not exist in the hollow portion 21 of the first cathode electrode, space potential of the hollow portion 21 becomes a high negative potential close to the potential $\phi_{k1}$ of the first cathode electrode 10a. Actually, the electrons in the plasma is reflected by and cannot reach the high negative potential portion which only the ions can reach. Therefore, positive space charge exists in the hollow portion 21 of the first cathode electrode 10a and the space potential thereof $\phi(r,Z_2)$ takes a value near zero in comparison with a potential in a case where the space charge does not exist therein. A portion of the ions passing through the hollow portion 21 is captured and forms an ion swarm and when the number of the ions in a group decreases, ion density increases and the maximum potential $\phi(0,Z_2)$ reaches the plasma space potential $\phi_p$, but it does not exceed $\phi_p$. The potential distribution for this embodiment in the hollow portion 21 is represented by FIG. 6c, in which the control electrode 11 is positioned at the portion of the distance r=Rg and the potential $\phi(Rg,Z_2)$ in the hollow portion 21 is predetermined to have a negative value lower than the plasma space potential $\phi_p$ i.e., $$\phi(Rg,Z_2) < \phi_p \quad (15).$$

Since the electric field actually has a zero component in the azimuth-direction in the electrostatic plug 12, the electrons ejected from the plasma 18 do not change their positions in the r-direction. Accordingly, the electrons that would collide with the control electrode if the first cathode electrode 10a would not exit, encounter the potential barrier $\phi_p - \phi(Rg,Z_2)$ as shown by the relationship (15) because of the existence of the first cathode electrode 10a in comparison with the case wherein the first cathode electrode is not used. The number of electrons colliding with the control electrode 11 can be easily reduced by several orders of magnitude in comparison with the case of no first cathode electrode by making the potential difference $\phi_p - \phi(Rg,Z_2)$ much larger than the voltage kTe/e (k: Boltzmann's constant) corresponding to the electron temperature Te of the plasma, i.e., by establishing the condition kTe/e $<< \phi_p - \phi(Rg,Z_2)$. Therefore, heating of the control electrode 11 due to the collision of the electrons can be effectively reduced by several orders of magnitude, which is one main characteristic function of the first cathode electrode 10a. The density of the electrons ejected from the plasma is in proportion to the product of the plasma density and square root and the electron temperature, so that the plasma of high density and temperature can be trapped for a long interval by the electrostatic plug including the first cathode electrode in comparison with the electrostatic plug shown in FIG. 3 or 4.

Figure 6C:
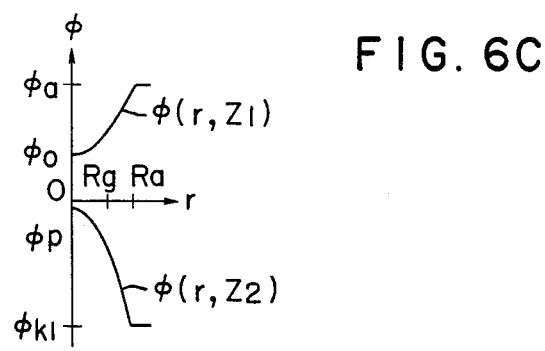

In a case where ions are lost at high time rate from the ion swarm, the potential $\phi(r,Z_2)$ at the hollow portion 21 of the first cathode electrode 10a accords with the potential shown in FIG. 6c only at $r=R_a$, and for $r<R_a$, the potential $\phi(r,Z_2)$ takes a negative value with respect to that shown in FIG. 6c. In this case, the potential barrier $\phi_p - \phi(Rg,Z_2)$ becomes larger than that shown in FIG. 6c, thus enhancing the effect of the first cathode electrode for confining the plasma for a long interval.

FIG. 8 shows a schematic diagram of another modification of the plasma device according to this invention, in which like reference numerals are added to elements corresponding to those shown in FIG. 3 or 4.

With this embodiment, the intermediate electrode has a positive potential with respect to that of the limiter and the limiter 16 is provided with an inner hollow portion extending along an arrowed direction of the magnetic field. The plasma space potential $\phi_p$ is controlled by a potential $\phi_I$ of the limiter 16 and the equation $$\phi_p = \phi_I + \phi_s \qquad (4)$$

is also established between these potentials and the sheath voltage. Reference numeral 30 designates a positive intermediate electrode disposed between an anode electrode 9 and the limiter 16 and the intermediate electrode 30 is provided with an inner hollow portion coaxial with the hollow portion of the limiter through which magnetic flux passes. The whole magnetic flux passes through the coaxial hollow portions of the limiter 16, the intermediate electrode 30, and the anode electrode 9. An electrostatic plug 12 is constituted by a cathode electrode 10, and a control electrode 11 in addition to the anode electrode 9, the positive intermediate electrode 30 and the limiter 16. The electrostatic plugs 12 are arranged at two point cusps of the open ends of the cusp magnetic field and form an electric field having a component (not zero) in parallel with the magnetic field.

Figure 7:
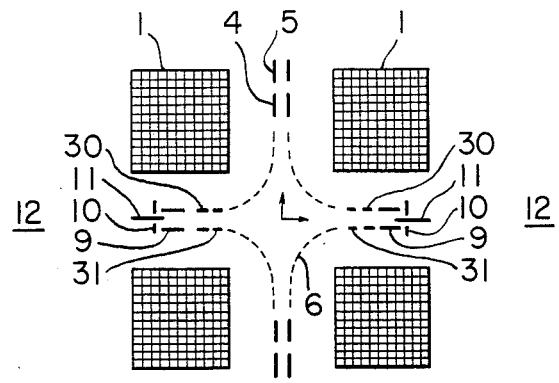
FIG. 7 is a schematic diagram of a further embodiment of the plasma device according to this invention.
Figure 8A:
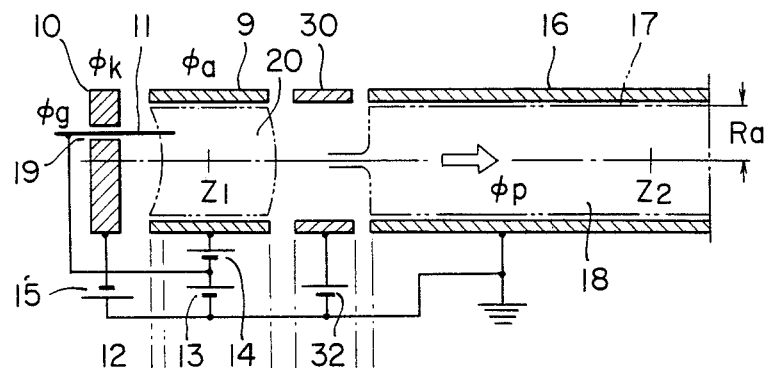
FIG. 8a is a schematic sectional view showing an electrostatic plug of the plasma device shown in FIG. 7.

In FIG. 8a showing the schematic view of the electrostatic plug 12 shown in FIG. 7, the limiter 16 is grounded and an electric potential $\phi_I$ is applied to the intermediate electrode 30 from a power source 32. The potentials $\phi_a$, $\phi_g$, and $\phi_k$ are applied from power sources 13 and 14, 13, and 15, respectively and the plasma 18 contacts with the inner surface of the limiter 16 through an ion sheath 17 so as to establish a potential relationship $$\phi_k < \phi_I = 0 < \phi_I < \phi_g < \phi_a \qquad (16)$$

The plasma space potential $\phi_p$ equals to $\phi_s$ in view of the relationship (4), and since the absolute values of the potentials $\phi_k$, $\phi_g$, and $\phi_a$ are made to be large for effectively operating the electrostatic plug 12, a relationship $$|\phi_p| << |\phi_k|, \phi_g, \phi_a$$

i.e., $$\phi_k < \phi_p < \phi_g < \phi_a \qquad (17)$$

is established in consideration of the relationship (16).

As shown in FIG. 8a, the cathode electrode 10 is disposed opposite to the intermediate electrode 30, interposing the anode electrical 9 therebetween with spaces, and the control electrode 11 passes through the through hole 19 provided for the cathode electrode 10 without contacting thereto and extends into the hollow portion 20 of the anode electrode 9.

Regarding the functions and effects of this embodiment, as described hereinbefore with reference to the embodiment shown in FIGS. 3 and 4, in consideration of the equations (7) and (8), the lowering of the potential barrier and the formation of the loss-aperture caused thereby can be avoided. Thus the plasma space potential is stably maintained to have the potential distribution as represented by the equation (7) by the operation of the control electrode 11, and the relationship $$|\phi_p| << |\phi_k|, \phi_g, \phi_a \qquad (9)$$

between the potentials is also established.

Figure 8B:
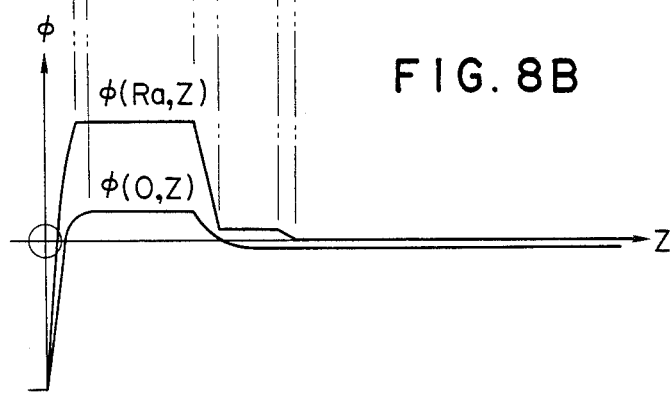
FIG. 8b is a diagram representing potential distribution in the plasma device shown in FIG. 7.

In FIG. 8b, there are shown a potential $\phi(0,Z)$ on the Z-axis and a potential $\phi(Ra,Z)$ on a line parallel to the Z-axis and contacting to the inner surface of the anode electrode 9.

The potential $\phi_0 = \phi(0,Z_1)$ is the minimum value of the potential $\phi(r,Z_1)$, so that regardless of the value of the distance r, the potential barriers to both the ions and electrons are formed as shown in FIG. 2 and it will be found that the loss-aperture does not exist. The plasma 18 exists inside the limiter 16 and is isolated from the electron group formed in the hollow portion of the anode electrode 9.

The ions and electrons are reflected by the potential barriers $\{\phi(r,Z_1) - \phi_p\}Z$ and $(\phi_p - \phi_k)$, respectively. The relationships $$\phi_0 - \phi_p >> kTi/Ze; \phi_p - \phi_k >> kTe/e \qquad (10)$$

corresponding to the relationship (1) can also be easily realized with this embodiment in view of the relationship (9), whereby the plasma trapping interval can be significantly increased.

The positive intermediate electrodes of this embodiment of the plasma device according to this invention effects as follows.

The potential $\phi_I$ of the intermediate electrode 30 is at a relatively low positive potential with respect to the limiter 16 which is earthed, and the shape of the boundary of the plasma inside the limiter 16 facing the electrostatic plug 12 can be controlled so as to have a shape having a small curvature except the neighborhood of the symmetric axis. Therefore, the component of radial direction of the electric field can be made very small in comparison with the case of no intermediate electrode and adverse effect on plasma trapping due to the acceleration of the electrons in the r-direction can be effectively avoided. Although the plasma boundary near the symmetric axis may be slightly complicated, less adverse effect is caused for the plasma trapping because the electric field near this portion is relatively weak.

Figure 9:
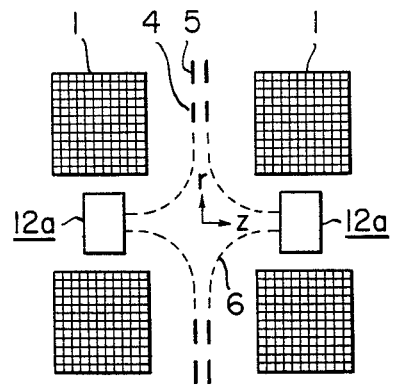
FIG. 9 is a schematic diagram of a still further embodiment of the plasma device according to this invention.

FIG. 9 is a schematic diagram showing a further modification of a plasma device according to this invention, in which like reference numerals are added to elements corresponding to those shown in FIGS. 3 through 8.

With this modification, the intermediate electrode is constituted as an intermediate electrode assembly 40 (see FIG. 10a) comprising a plurality (for example, respectively four electrodes in FIG. 10) of anode and cathode electrodes 41 and 42 which are arranged alternately.

Figure 10A:
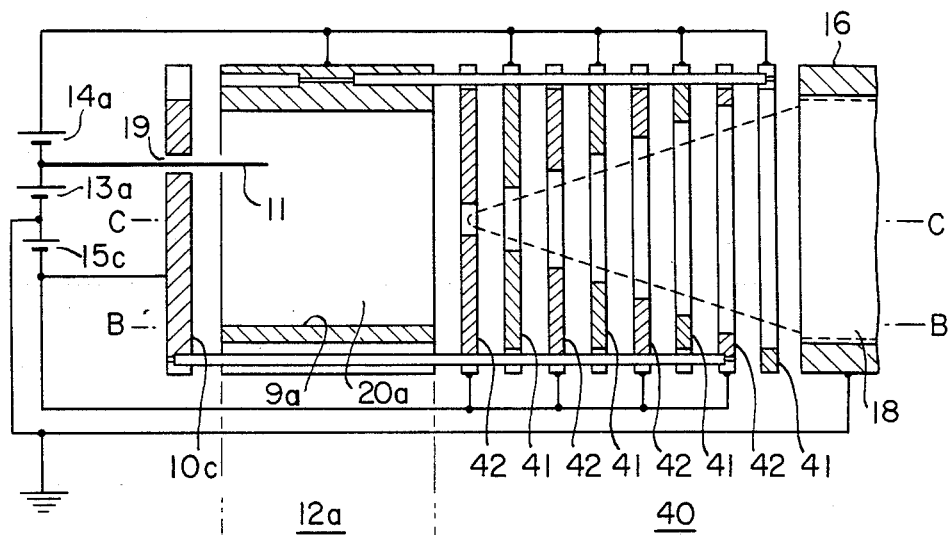
FIG. 10a is a schematic sectional view showing an electrostatic plug of the plasma device shown in FIG. 9.

FIG. 10a shows a schematic view of an electrostatic plug 12a shown in FIG. 9 and in FIG. 10a, reference numeral 9a designates the anode electrode provided with the inner hollow portion 20a extending in a direction of the magnetic field and arranged coaxially with a hollow limiter 16, and a cathode electrode 10c is arranged so as to cover the open end of the anode electrode 9a on the side opposite to the side of the limiter 16. A control electrode 11 passes through the through hole 19 provided for the cathode electrode 10c and extends into the hollow portion 20 of the anode electrode 9a. The intermediate electrode assembly 40 is arranged between the anode electrode 9a and the limiter 16 to be coaxial therewith and the respective electrodes 41 and 42 are provided with coaxial through holes which are converged from the limiter side towards the anode electrode side. Reference numerals 13a, 14a, and 15c designate d.c. power sources which apply potentials to the anode electrodes 9a and 41, the control electrode 11, the limiter 16, and the cathode electrodes 10c and 42 respectively, their potential being higher in the stated order. With this embodiment, the electrostatic plug 12 comprises the anode and cathode electrodes 9a and 10c, the control electrode 11, the intermediate electrode assembly 40, the limiter 16, and the power sources 13a, 14a and 15c, the electrostatic plugs 12 being arranged at two point cusps on the open ends of the cusp magnetic field. A potential $\phi_a$ is applied to the anode electrode 9a and four anode electrods 41 of the electrode assembly 40 from the power sources 13a and 14a. Potentials $\phi_g$ and $\phi_k$ are applied to the control electrode 11, the cathode electrode 10c, and the cathode electrodes of the assembly 40 from the power sources 13a and 15c, respectively. These potentials have such relationship as $$\phi_k < 0 < \phi_g < \phi_a \qquad (18)$$

Since, as described hereinbefore, the relationship $|\phi_p| << |\phi_k|$, $\phi_g$, $\phi_a$ with respect to the former embodiments, and hence the relationship $\phi_k < \phi_p < \phi_g < \alpha_a$ are established.

Regarding the functions and effects of this embodiment, as described hereinbefore with reference to the former embodiments, in consideration of the equations (7) and (8), the lowering of the potential barrier and the formation of the loss-aperture caused thereby can be avoided, as a result of the potential controlling effect of the control electrode 11, whereby the plasma space potential $\phi_p$ can be stably maintained to have the potential as given by the equation (4), and the relationship $$|\phi_p| << |\phi_k|, \phi_g, \phi_a \qquad (9)$$

between the respective potentials is also established. It is noted that in the above description, the hollow portion 20a of the anode electrode 9a is equivalent to that 20 of the anode electrode 9 of the embodiment shown, for example, in FIG. 4.

Figure 10B:
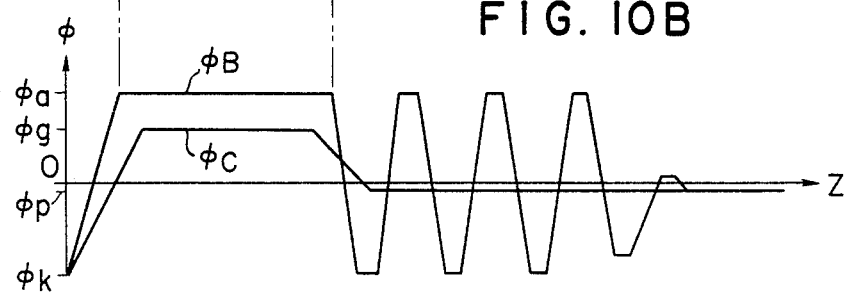
FIG. 10b is a diagram representing potential distribution in the plasma device shown in FIG. 9.

In FIG. 10b, there are shown a potential $\phi_C$ on the line C—C, i.e., Z-axis and a potential $\phi_B$ on the line B—B parallel to the line C—C and contacting with the inner surface of the anode electrode 9a. The potential $\phi_0$ in the hollow portion 20 of the anode electrode 9a is the minimum value of the potential $\phi$, so that regardless of the value of the distance r the potential barriers to both the ions and electrons are formed, and the loss-aperture does not exist. The ions and electrons are reflected by the potential barriers $(\phi-\phi_p)Z$ and $\phi_p-\phi_k$, respectively, and the relationships $$\phi_0 - \phi_p >> KT_i/Ze; \phi_p - \phi_k >> kT_e/e$$

corresponding to the relationship (1) is easily realized in view of the relationship (9). Therefore, the plasma trapping interval can be largely increased according to this embodiment. With a usual electrostatic plug, electrons ejected from the plasma confined by a limiter and reflected again into the plasma by a potential barrier formed by a cathode electrode creat an electric field in the r-direction in the hollow portion of an anode electrode as a result of the formation of space charge during the flight of the electrons in the hollow portion of the anode electrode. However, in a case where the density and temperature of the plasma increase greatly, the number of electrons to be ejected from the plasma increases and the electric field formed in the hollow portion of the anode electrode is strengthened, and the anode potential is shielded near the hollow portion so as to adversely effect the electrostatic plugging operation. In order to obviate this defect it is necessary to limit the density and the temperature of the plasma to be created to relatively low values, which is a significant problem for the plasma trapping operation.

According to the embodiment shown in FIGS. 9 and 10 of this invention, this problem can be solved by arranging the intermediate electrode assembly comprising a plurality of alternately arranged anode and cathode electrodes which are converged coaxially through holes between the limiter and the anode electrode. This function and effect will be described hereunder in conjunction with FIGS. 10a and 10b.

In a case where a lot of electrons and ions are ejected from the plasma at a high density and temperature, the potentials of the anode and cathode electrodes 41 and 42 are shielded as described above near the axis of symmetry and the plasma moves through the through holes of these electrodes 41 and 42 as shown by dotted lines in FIG. 10a. In this case, since an electric filed is formed outside the boundary of the plasma 18 in the r-direction to thereby form a potential barrier to the ions and electrons. Thus, the thickness of the plasma passing through one pair of anode and cathode electrodes 41 and 42 becomes thin with respect to the plasma passing through another pair of electrodes 41 and 42 arranged at the preceding stage in the intermediate electrode assembly 40. By presetting the number of paired anode and cathode electrodes 41 and 42 as occasion demands, sufficinetly thin plasma can be obtained at the anode electrode of the last stage, whereby the electrostatic plugging with substantially no loss-aperture can be obtained by the operation of the cathode electrode 10c and the control electrode 11 to thereby effectively confine plasma at high density and temperature, which is the second significant advantage of this invention.

Figure 11:
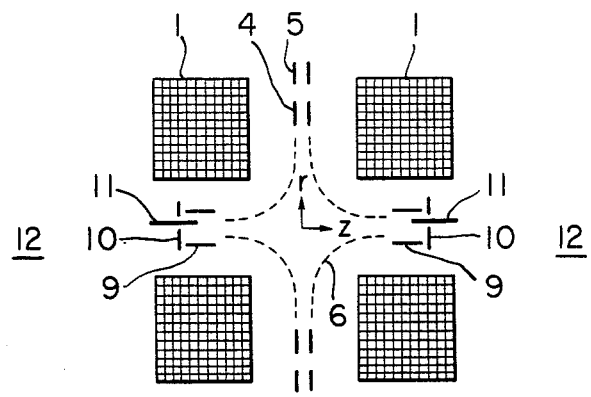
FIG. 11 is a schematic diagram of a still further embodiment of the plasma device according to this invention.

FIGS. 11 and 12 show a further modification of the plasma device according to this invention, in which like reference numerals are added to elements corresponding to those shown in FIGS. 3 through 10.

Figure 12A:
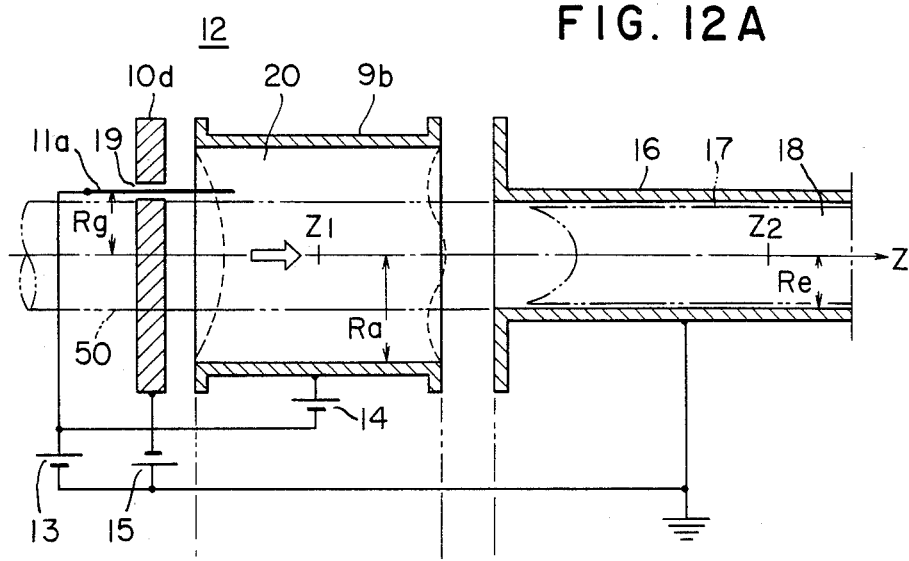
FIG. 12a is a schematic sectional view showing an electrostatic plug of the plasma device shown in FIG. 11.

As clearly shown in FIG. 12a, the electrostatic plug 12 comprises an anode electrode 9b, a cathode electrode 10d, a control electrode 11a, and the limiter 16 attached to a vacuum vessel. The positional relationship between these members is substantially equal to that of the embodiment shown in FIG. 4a. Although with the embodiment shown in FIG. 4a, the inner diameters of the cylindrical hollow anode electrode 9 and the limiter 16 are equal and the outer diametes thereof are substantially equal to that of the cathode electrode 10d, with the embodiment shown in FIG. 12a, the inner diameter of the hollow cylindrical anode-electrode 9b is made larger than that of the limiter 16. In this connection, the cathode electrode 10d is provided with a through hole 19 through which a control electrode 11a passes without contacting with the cathode electrode 10d, and the control electrode 11a extends into the hollow portion 20 of the anode electrode 9b and is positioned outside the extension of the hollow portion of the limiter 16 as shown in FIG. 12a.

Figure 12B:
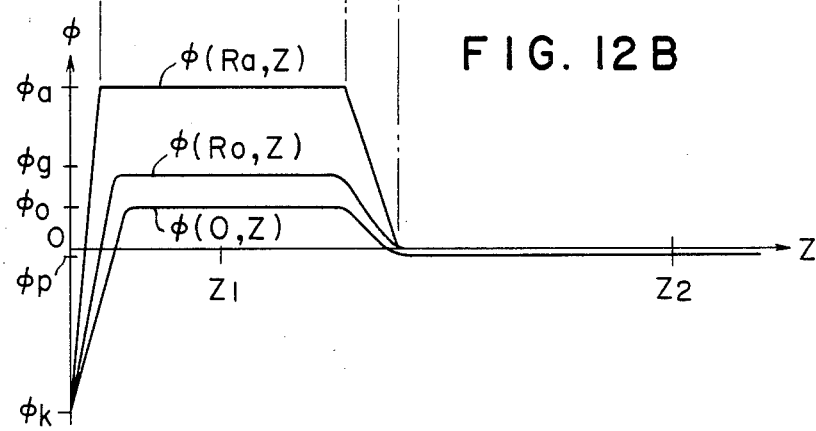
FIGS. 12b and 12c are diagrams representing potential distributions in the plasma device shown in FIG. 11.
Figure 12C:
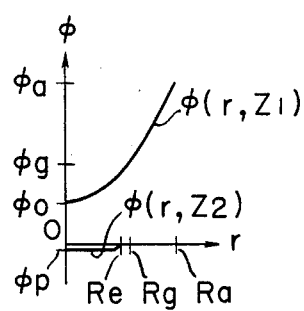
Figure 13:
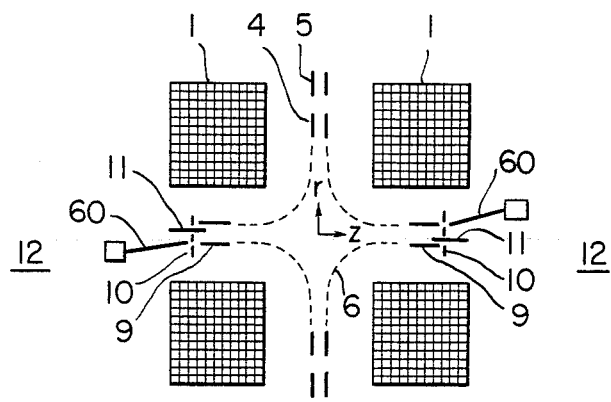
FIG. 13 is a schematic diagram of a modification of the plasma device according to this invention.

According to the construction of the electrostatic plug 12 shown in FIG. 12a and in consideration of FIGS. 12b and 12c, the potential distribution $\phi(r,Z_2)$ of the plasma space 18 is shown in FIG. 12c and the potentials $\phi(0,Z)$ on the Z-axis, $\phi(Ra,Z)$ on a line parallel to the Z-axis and contacting with the inner surface of the anode electrode 9b, and $\phi(Rl, Z)$ on a line parallel to the Z-axis and contacting with the inner surface of the limiter 16. The potential $\phi_0=\phi(0,Z_1)$ is the minimum value of the potential $\phi(r,Z_1)$ so that regarding the whole values of the distance r, the potential barriers are formed to the ions and electrons as shown in FIG. 2, and the loss-aperture does not exist in the inner hollow portion 20 of the anode electrode. The plasma 18 exists inside the limiter 16 and is isolated from the electron group generated in the hollow portion 20. The ions and electrons are reflected by the potential barriers $\{\phi(r,Z_1)-\phi_p\}Z$ and $(\phi_p-\phi_k)$, respectively, and the relationships $$\phi_0-\phi_p >> kT_i/Ze; \phi_p-\phi_k >> kT_e/e$$

corresponding to the relationship (1) are easily realized in view of the relationship (9). Therefore, the plasma trapping interval can be largely increased according to this embodiment of this invention.

The ions ejected from the plasma 18 confined within the boundary 6 towards the electrostatic plug 12 are reflected and return towards the plasma before arriving at the hollow portion 20 because of the existence of the potential barrier $\{\phi(r,Z_1)-\phi_p\}Z$. The electrons advance towards the cathode electrode 10d through the hollow portion 20 of the anode electrode 9b and are then reflected again by the potential barrier $(\phi_p-\phi_k)$ towards the plasma space. Because the azimuth-directional component of the electric field is substantially zero, so that the electrons do not move across the magnetic line of force in the r-direction, the electrons do not move on the surface of magnetic flux tubes each consisting of magnetic lines of force passing through a circle which is defined by rotating, about the axis of symmetry, a point at which the electron is ejected from the plasma space. These magnetic fluxes exist wholly within the magnetic flux tube 50 contacting with the inner surface of the limiter 16, so that the reflected electrons return into the plasma space without escaping from the tube 50.

Since the control electrode 11a is positioned outside the magnetic flux tube 50, no insulation break-down between the control electrode 11a and the cathode electrode 10d is observed which may be caused by the entrance of the electrons into the through hole 19 of the cathode electrode 10d, so that sufficiently high potential barriers are formed against the ions and electrons to thereby increase the plasma trapping interval. In addition, since the electrons are not moved towards the control electrode 11a, the temperature of the control electrode does not rise even if a lot of electrons are moved from the plasma 18 at high temperature and density towards the electrostatic plug 12, thus enabling the confinement of the plasma with high density and high temperature according to this embodiment of this invention.

According to this invention, a gas supply device can be combined with the electrostatic plug 12 of each of all plasma devices described hereinbefore in conjunction with the embodiments shown in FIGS. 3 through 12 for improving functions and effects of this invention and one typical example in which the gas supply device is combined with the electrostatic plug shown in FIG. 3 or 4 will be described hereunder in conjunction with FIGS. 3, 4, 13 and 14.

Figure 14:
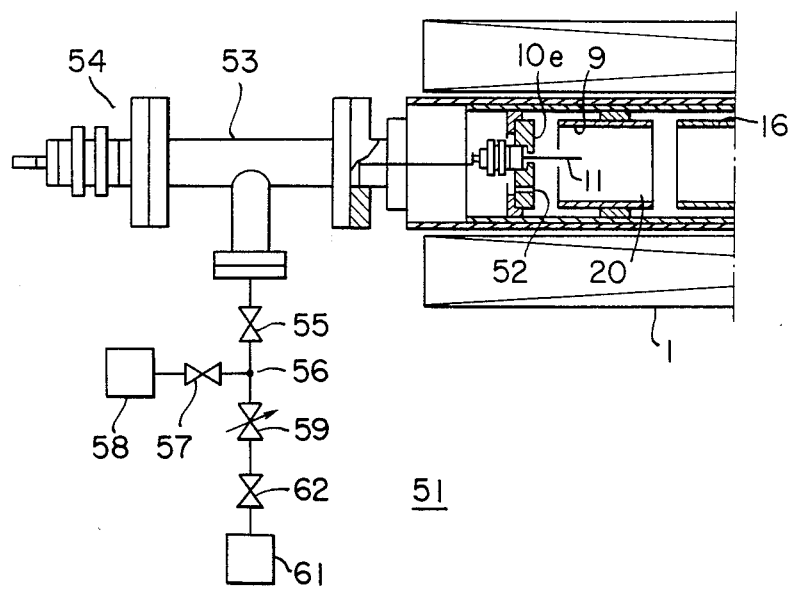
FIG. 14 is schematic sectional view of the electrostatic plug provided with a gas supplying device.

Referring to FIG. 14, a gas supply device 51 mainly comprises a gas reservoir 61, pumping means 28, a high voltage supply device 54, valves, and tee members 53, 56 connecting these members and an electrostatic plug 12. The tee member 53 has end portions connecting tightly to the electrostatic plug 12, the high voltage supply device 54 for supply electricity to the plug 12, and another tee member 56 through a valve 55. The tee member 56 is connected to the exhauster 58 and the reservoir 61 through a flow variable valve 59 and a valve 60. The gas flow rate which is adjusted by the valve 59 is supplied from the reservoir 61 into the plug 12, i.e. into the hollow portion 20 of the anode electrode 9 through a through hole 52 provided for the cathode electrode 10e. The distance of the through hole 52 from the axis of the hollow portion 20 is predetermined to be longer than the distance of the axis of the control electrode 11 from the axis of the hollow portion 20.

Although the functions and effects attained by combining the gas supply device will be described hereunder, the principle as to the potential barrier to the ions and electrons is substantially the same as those described hereinbefore. In a case where the plasma is under high density and temperature, the number of electrons which are ejected from and return to the hollow portion of the anode electrode 9 increases and the number of electrons which are newly captured to the electrons captured by the collision therebetween in the hollow portion 20 increases. When the amount of the newly captured electrons increases, the equiliblium between electron groups near the axis of the hollow portion 20 is not maintained because the electrons are mainly captured at a portion near the axis thereof. This fact adversely affects the control electrode to control the space potential, thus the loss-aperture may be formed near the axis of the hollow portion 20. According to this invention, by applying gas, preferably the same gas as that constituting the plasma, into the hollow portion from the external gas supplying device, the equiliblium of the electron groups can be maintained for the reason that molecules of the introduced gas are ionized and the electrons thus generated are captured near the axis of the hollow portion 20 of the anode electrode 9. For this purpose, the distance between the axis of the hollow portion 20 and the through hole 52 for introducing the gas is preset to be longer than that between the axis of the control electrode 11 and the axis of the hollow portion 20. Therefore, the plasma at high temperature and density can effectively be confined for a long interval. This advantageous effect can be further improved by combining the gas supply device 51 with the electrostatic plugs 12 shown in FIGS. 5 through 12.

In the foregoing, the embodiments and modifications were described with respect to open-ended plasma devices utilizing the cusp magnetic fields, but the magnetic fields are not necessarily limited to the cusp magnetic field and, for example, a uniform magnetic field or a mirror magnetic field can be utilized according to the open-ended plasma devices of this invention.

In addition, in the embodiments, a fine control electrode is used, but a plurality of electrodes or a ring shaped electrode may be used therefor. Moreover, the plasma device according to this invention can be used for nuclear fusion, surface treatment, surface welding, ion sources, etc.

I claim:

1. In a plasma device of the type comprising a vacuum vessel, means for creating an open-ended magnetic field containing a plasma, and a plurality of electrostatic plugs disposed at open-ended portions of said magnetic field and forming an electric field having a component parallel to the direction of said magnetic field, at least one of said electrostatic plugs including a limiter grounded to said vacuum vessel, provided with an inner hollow portion and arranged so as to control a potential of the space in which said plasma is confined, the improvement in which said electrostatic plug comprises, in addition to said limiter, an anode electrode disposed at an open-ended portion spaced therefrom and provided with an inner hollow portion extending along a direction of said open-ended magnetic field so as to allow all magnetic lines passing through the inner hollow portion of said limiter to pass through said hollow portion of said anode electrode, a cathode electrode spaced from said anode electrode and disposed on a side of said anode electrode opposite to said limiter, said cathode electrode being provided with a through hole, a control electrode disposed so as to pass through the through hole of said cathode electrode and extending into the hollow portion of said anode electrode without contacting with said cathode electrode for controlling electron density thereby to determine the space potential distribution, and means for applying potentials to said anode electrode, said control electrode, said limiter, and said cathode electrode, said potentials being higher in the stated order.

2. The plasma device according to claim 1 wherein the diameter of the inner hollow portion of said anode electrode is substantially equal to the diameter of the inner hollow portion of said limiter and the diameter of said cathode electrode is larger than the inner diameter of said anode electrode.

3. The plasma device according to claim 1 wherein the diameter of the inner hollow portion of said anode electrode is larger than the diameter of the inner hollow portion of said limiter and the diameter of said cathode electrode is larger than the inner diameter of said anode electrode and wherein said through hole of said cathode electrode through which said control electrode extends into the inner hollow portion of said anode electrode is positioned outside of the inner diameter of said limiter.

4. The plasma device according to claim 1, wherein said electrostatic plug further comprises an intermediate electrode disposed between said anode electrode and said limiter and provided with an inner hollow portion coaxial with said anode electrode and said limiter, said intermediate electrode functioning as another cathode electrode.

5. The plasma device according to claim 4 wherein said intermediate electrode comprises an electrode having a negative potential with respect to that of said limiter so that potentials to be applied to said anode electrode, said control electrode, said limiter, said intermediate electrode, and said cathode electrode have higher magnitudes in the stated order.

6. The plasma device according to claim 4 wherein said intermediate electrode comprises an electrode having a positive potential with respect to that of said limiter so that potentials to be applied to said node electrode, said control electrode, said intermediate electrode, said limiter, and said cathode electrode have higher magnitudes in the stated order.

7. The plasma device according to claim 4 wherein said intermediate electrode comprises at least one elemental anode electrode and one elemental cathode electrode arranged alternately in an axial direction thereof and provided with inner through holes coaxial with said anode electrode and said limiter so as to converge from said limiter towards said anode electrode and potentials to be applied to said anode electrode, said control electrode, said limiter, and said cathode electrode have higher magnitudes in the stated order.

8. The plasma device according to claim 1 wherein said electrostatic plug further comprises means for supplying gas into the inner hollow portion of said anode electrode through a further through hole provided for said cathode electrode at a position where a distance between the axis of said hollow portion and said further through hole is larger than a distance between the axis of said control electrode and the axis of said hollow portion.

9. The plasma device according to claim 4 wherein said electrostatic plug further comprises means for supplying gas into the inner hollow portion of said anode electrode through a further through hole provided for said cathode electrode at a position where a distance between the axis of said hollow portion and said further through hole is larger than a distance between the axis of said control electrode and the axis of said hollow portion.

* * * * *